US012508453B2

(12) United States Patent
Cutting et al.

(10) Patent No.: US 12,508,453 B2
(45) Date of Patent: Dec. 30, 2025

(54) CONTROLLED SYSTEM AND METHODS OF STORAGE STRUCTURE FIRE PROTECTION

(71) Applicant: Tyco Fire Products LP, Cranston, RI (US)

(72) Inventors: Sean E. Cutting, West Warwick, RI (US); Ian M. Jutras, Sharon, MA (US); Scott T. Macomber, Johnston, RI (US); Cassandra Lyn DeNunzio, Cranston, RI (US); Manuel R. Silva, Jr., Cranston, RI (US)

(73) Assignee: Tyco Fire Products LP, Cranston, RI (US)

( * ) Notice: Subject to any disclaimer, the term of this patent is extended or adjusted under 35 U.S.C. 154(b) by 338 days.

(21) Appl. No.: 18/247,192

(22) PCT Filed: Nov. 24, 2021

(86) PCT No.: PCT/IB2021/060926

§ 371 (c)(1),
(2) Date: Mar. 29, 2023

(87) PCT Pub. No.: WO2022/130073

PCT Pub. Date: Jun. 23, 2022

(65) Prior Publication Data

US 2023/0347191 A1 Nov. 2, 2023

Related U.S. Application Data

(60) Provisional application No. 63/126,706, filed on Dec. 17, 2020.

(51) Int. Cl.
*A62C 3/00* (2006.01)
*A62C 37/40* (2006.01)

(52) U.S. Cl.
CPC .............. *A62C 3/002* (2013.01); *A62C 37/40* (2013.01)

(58) Field of Classification Search
CPC ................................ A62C 3/002; A62C 37/40
See application file for complete search history.

(56) References Cited

U.S. PATENT DOCUMENTS 4,276,939 A 7/1981 Atack
6,296,808 B1 * 10/2001 Pearman ................ A62C 37/14 169/56

(Continued)

FOREIGN PATENT DOCUMENTS

JP 2007-252636 A 10/2007
KR 10-1628025 B1 6/2016

(Continued)

OTHER PUBLICATIONS

Korean Intellectual Property Office as International Searching Authority; International Search Report and Written Opinion; International Patent Application No. PCT/IB2021/060926; Feb. 23, 2022; 13 pages.

*Primary Examiner* — Joseph A Greenlund
(74) *Attorney, Agent, or Firm* — Foley & Lardner LLP

(57) ABSTRACT

Systems and methods of ceiling-only fire protection of a storage structure are disclosed herein. The system comprising a plurality of fluid distribution devices disposed in a grid pattern beneath a ceiling and above the storage structure. The plurality of fluid distribution devices comprising a frame body, seal assembly and actuator. The system further comprising a fluid distribution system including a network of pipes interconnecting the plurality of fluid distribution devices with a water supply. The system further comprising a plurality of detectors to monitor the storage structure for a fire. The system further comprising a controller coupled with the plurality of detectors to detect and locate the fire, and (Continued)

coupled with the plurality of fluid distribution devices to identify and control operation of a select number of the plurality of fluid distribution devices that define a discharge array above and about the fire.

18 Claims, 11 Drawing Sheets

(56) References Cited

U.S. PATENT DOCUMENTS

| | | | | |
|---|---|---|---|---|
| 10,441,830 | B2 * | 10/2019 | Magnone | A62C 3/002 |
| 10,960,244 | B2 * | 3/2021 | Magnone | A62C 37/36 |
| 2005/0001729 | A1 * | 1/2005 | Garmer | G01J 1/0219 340/600 |
| 2009/0288846 | A1 * | 11/2009 | Leblanc | A62C 35/645 169/17 |
| 2015/0027739 | A1 * | 1/2015 | Multer | A62C 35/68 169/37 |
| 2016/0059059 | A1 * | 3/2016 | Xin | A62C 37/44 169/61 |
| 2016/0321900 | A1 * | 11/2016 | Rao | B05B 12/12 |
| 2017/0007864 | A1 * | 1/2017 | Magnone | A62C 3/002 |
| 2017/0113078 | A1 * | 4/2017 | Magnone | A62C 3/00 |
| 2018/0093828 | A1 * | 4/2018 | Lindbo | A62C 35/68 |
| 2018/0200552 | A1 * | 7/2018 | Wertsberger | A62C 37/40 |
| 2018/0361184 | A1 * | 12/2018 | Pohl | A62C 37/36 |
| 2019/0054333 | A1 * | 2/2019 | McNamara | A62C 35/023 |
| 2019/0247691 | A1 * | 8/2019 | Trivelpiece | A62C 37/10 |
| 2022/0262539 | A1 * | 8/2022 | Huang | B32B 5/26 |
| 2023/0347191 | A1 * | 11/2023 | Cutting | A62C 37/40 |
| 2023/0395281 | A1 * | 12/2023 | Huang | H01M 10/625 |
| 2025/0121223 | A1 * | 4/2025 | Livchak | A62C 37/48 |
| 2025/0149751 | A1 * | 5/2025 | Yun | H01M 50/522 |

FOREIGN PATENT DOCUMENTS

| | | | |
|---|---|---|---|
| WO | WO-2015/100367 | A1 | 7/2015 |
| WO | WO-2015/195974 | A1 | 12/2015 |

* cited by examiner

CONTROLLED SYSTEM AND METHODS OF STORAGE STRUCTURE FIRE PROTECTION

CROSS-REFERENCE TO RELATED APPLICATIONS

The present disclosure claims the benefit of and priority to U.S. Provisional Application No. 63/126,706, titled "CONTROLLED SYSTEM AND METHODS OF STORAGE STRUCTURE FIRE PROTECTION," filed Dec. 17, 2020, the disclosure of which is incorporated herein by reference in its entirety.

BACKGROUND

Fire protection systems are used to deliver fluid to a location at which a fire may be taking place. Fire protection systems can be actuated in response to trigger conditions, such as smoke or heat. Electronic fire protection systems can be actuated using an electric impulse.

SUMMARY

Aspects described herein relate to a system of ceiling-only fire protection of a storage structure. The system comprising a plurality of fluid distribution devices, a fluid distribution system, a plurality of detectors to monitor the storage structure for a fire, and a controller. The plurality of fluid distribution devices disposed in a grid pattern beneath a ceiling and above the storage structure. The storage structure having a nominal storage height less than a nominal ceiling height. Each of the fluid distribution devices including a frame body with a seal assembly disposed therein. Each of the fluid distribution devices further including an actuator arranged with the frame body to displace the seal assembly to control a flow of water discharge from the frame body. The fluid distribution system including a network of pipe interconnecting the plurality of fluid distribution devices with a water supply. The controller coupled with the plurality of detectors to detect and locate the fire. The controller being further coupled with the plurality of fluid distribution devices to identify and control operation of a select number of the plurality of fluid distribution devices that define a discharge array above and about the fire. The controller receives an input signal from each of the plurality of detectors. The controller further determines a first threshold moment in fire growth from one detector of the plurality of detectors, a second threshold moment in fire growth from two adjacent detectors of the plurality of detectors, or a third moment in fire growth from three adjacent detectors of the plurality of detectors.

At least one aspect relates to a system of ceiling-only fire protection of a storage structure. The system comprising a plurality of fluid distribution devices, a fluid distribution system, a plurality of detectors to monitor the storage structure for a fire, and a controller. The plurality of fluid distribution devices disposed in a grid pattern beneath a ceiling and above the storage structure. The storage structure having a nominal storage height less than a nominal ceiling height. Each of the fluid distribution devices including a frame body with a seal assembly disposed therein. Each of the fluid distribution devices further including an actuator arranged with the frame body to displace the seal assembly to control a flow of water discharge from the frame body. The fluid distribution system including a network of pipe interconnecting the plurality of fluid distribution devices with a water supply. The controller coupled with the plurality of detectors to detect and locate the fire. The controller being further coupled with the plurality of fluid distribution devices to identify and control operation of a select number of the plurality of fluid distribution devices that define a discharge array above and about the fire. The controller receives an input signal from each of the plurality of detectors. The controller further determines a rate of temperature rise and temperature for each of the plurality of detectors. The controller further generates a ranking for each of the plurality of detectors based on a weighted value based on the rate of temperature rise and temperature for each of the plurality of detectors. The controller further determines a threshold moment in fire growth from a first detector of the plurality of detectors. The controller further generates an output signal for operation of a first fluid distribution device associated with the first detector of the plurality of detectors and fluid distribution devices surrounding the first fluid distribution device.

At least one aspect relates to a system of ceiling-only fire protection of a storage structure. The system comprising a plurality of fluid distribution devices, a fluid distribution system, a plurality of detectors to monitor the storage structure for a fire, and a controller. The plurality of fluid distribution devices disposed in a grid pattern beneath a ceiling and above the storage structure. The storage structure having a nominal storage height less than a nominal ceiling height. Each of the fluid distribution devices including a frame body with a seal assembly disposed therein. Each of the fluid distribution devices further including an actuator arranged with the frame body to displace the seal assembly to control a flow of water discharge from the frame body. The fluid distribution system including a network of pipe interconnecting the plurality of fluid distribution devices with a water supply. The controller coupled with the plurality of detectors to detect and locate the fire. The controller being further coupled with the plurality of fluid distribution devices to identify and control operation of a select number of the plurality of fluid distribution devices that define a discharge array above and about the fire. The controller receives an input signal from each of the plurality of detectors. The controller further determines a first threshold moment in fire growth has been met by a first detector of the plurality of detectors. The controller further determines a subset of the plurality of detectors surrounding the first detector. The controller further receives an input signal at a second frequency from each of the subset of the plurality of detectors, wherein the second frequency is higher than the first frequency.

At least one aspect relates to a system comprising a plurality of detectors and a controller. The plurality of detectors disposed in a grid pattern including transmitters and receivers to monitor the storage structure for a fire. The controller coupled with the plurality of detectors. The controller prompts each of the plurality of detectors to individually transmit a locating signal of a predetermined magnitude. The controller further receives, via a plurality of detectors, a detected locating signal. The controller further determines adjacency of the plurality of detectors based on a trilateration of the received locating signals.

At least one aspect relates to a method for providing a ceiling-only fire protection system of a storage structure. The method comprising providing a plurality of fluid distribution devices disposed in a grid pattern beneath a ceiling and above the storage structure. The storage structure having a nominal storage height less than a nominal ceiling height. Each of the fluid distribution devices including a frame body with a seal assembly disposed therein. Each of the fluid distribution devices further including an actuator arranged with the frame body to displace the seal assembly to control a flow of water discharge from the frame body. The method further comprises providing a fluid distribution system including a network of pipes interconnecting the plurality of fluid distribution devices with a water supply. The method further comprises providing a plurality of detectors to monitor the storage structure for a fire. The method further comprises providing a controller coupled with the plurality of detectors to detect and locate the fire. The controller further coupled with the plurality of fluid distribution devices to identify and control operation of a select number of the plurality of fluid distribution devices that define a discharge array above and about the fire. The controller configured to receive an input signal from each of the plurality of detectors. The controller further configured to determine a first threshold moment in fire growth from one detector of the plurality of detectors, a second threshold moment in fire growth from two adjacent detectors of the plurality of detectors, or a third threshold moment in fire growth from three adjacent detectors of the plurality of detectors.

At least one aspect relates to a method for providing a ceiling-only fire protection system of a storage structure. The method comprising providing a plurality of fluid distribution devices disposed in a grid pattern beneath a ceiling and above the storage structure. The storage structure having a nominal storage height less than a nominal ceiling height. Each of the fluid distribution devices including a frame body with a seal assembly disposed therein. Each of the fluid distribution devices further including an actuator arranged with the frame body to displace the seal assembly to control a flow of water discharge from the frame body. The method further comprises providing a fluid distribution system including a network of pipes interconnecting the plurality of fluid distribution devices with a water supply. The method further comprises providing a plurality of detectors to monitor the storage structure for a fire. The method further comprises providing a controller coupled with the plurality of detectors to detect and locate the fire. The controller further coupled with the plurality of fluid distribution devices to identify and control operation of a select number of the plurality of fluid distribution devices that define a discharge array above and about the fire. The controller configured to receive an input signal from each of the plurality of detectors. The controller further configured to determine a rate of temperature rise and a temperature for each of the plurality of detectors. The controller further configured to generate a ranking for each of the plurality of detectors based on a weighted value based on the rate of temperature rise and the temperature for each of the plurality of detectors. The controller further configured to determine a threshold moment in fire growth for a first detector of the plurality of detectors. The controller further configured to generate an output signal for operation of a first fluid distribution device associated with the first detector of the plurality of detectors and fluid distribution devices surrounding the first fluid distribution device.

At least one aspect relates to a method for providing a ceiling-only fire protection system of a storage structure. The method comprising providing a plurality of fluid distribution devices disposed in a grid pattern beneath a ceiling and above the storage structure. The storage structure having a nominal storage height less than a nominal ceiling height. Each of the fluid distribution devices including a frame body with a seal assembly disposed therein. Each of the fluid distribution devices further including an actuator arranged with the frame body to displace the seal assembly to control a flow of water discharge from the frame body. The method further comprises providing a fluid distribution system including a network of pipes interconnecting the plurality of fluid distribution devices with a water supply. The method further comprises providing a plurality of detectors to monitor the storage structure for a fire. The method further comprises providing a controller coupled with the plurality of detectors to detect and locate the fire. The controller further coupled with the plurality of fluid distribution devices to identify and control operation of a select number of the plurality of fluid distribution devices that define a discharge array above and about the fire. The controller configured to receive an input signal at a first frequency from each of the plurality of detectors. The controller further configured to determine a first threshold moment in fire growth has been met by a first detectors of the plurality of detectors. The controller further configured to determine a subset of the plurality of detectors surrounding the first detectors. The controller further configured to receive an input signal at a second frequency from each of the subset of the plurality of detectors, wherein the second frequency is higher than the first frequency.

At least one aspect relates to a method comprising providing a plurality of detectors disposed in a grid pattern including transmitters and receivers to monitor the storage structure for a fire. The method further comprises coupling a controller with the plurality of detectors. The controller configured to prompt each of the plurality of detectors to individually transmit a locating signal of a predetermined magnitude. The controller further configured to receive from the plurality of detectors, a detected locating signal magnitude. The controller further configured to determine adjacency of the plurality of detectors based on a trilateration of the received locating signals.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

Figure 1:
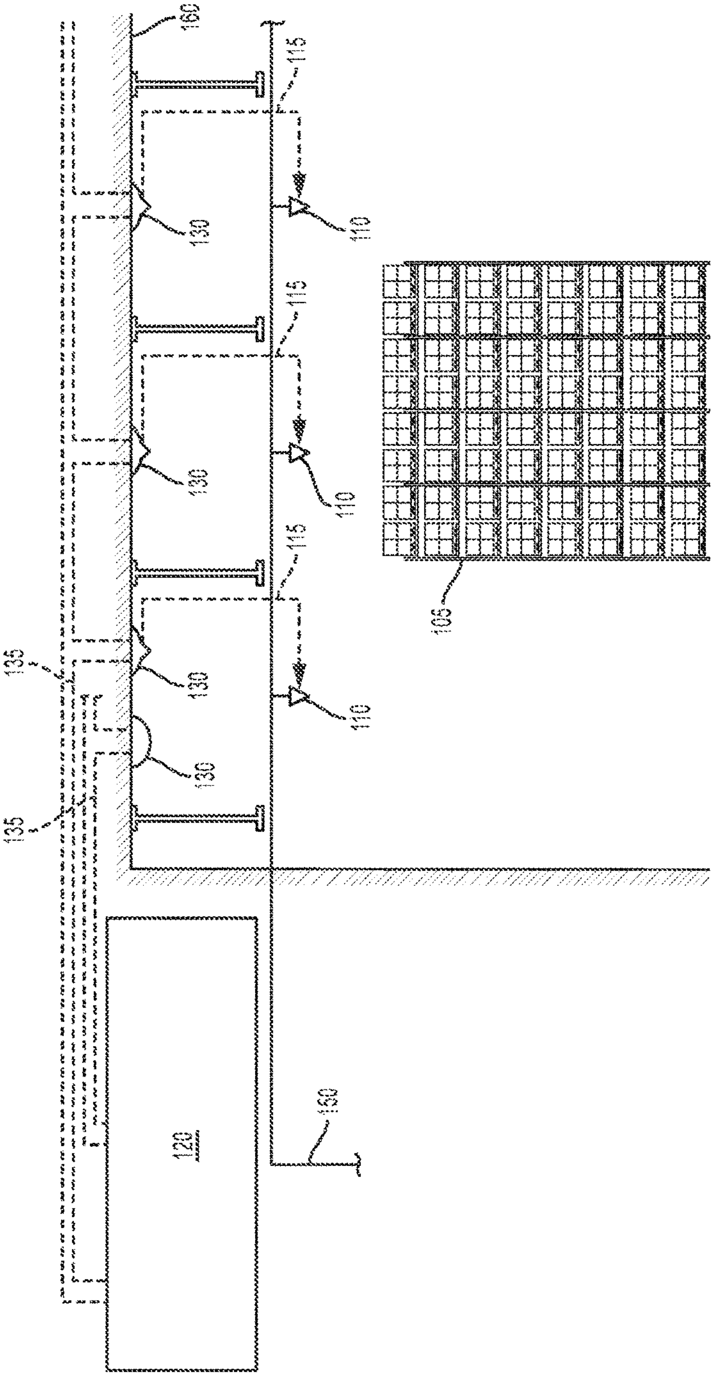
FIG. 1 is an illustration of a ceiling-only fire protection of a storage structure.

Referring to FIG. 1, among others, shows a fire protection system 100 for the protection of the storage structure 105 and an occupancy of the storage structure 105. The systems and methods described herein utilize two principles for fire protection of the storage occupancy: (i) detection and location of a fire; and (ii) responding to the fire at a threshold moment with a controlled discharge and distribution of a preferably fixed minimized volumetric flow of firefighting fluid, such as water, over the fire to effectively address and more preferably extinguish the fire. Moreover, the systems and methods include fluid distribution devices coupled with a means to address and more preferably extinguish a fire.

The fire protection system 100 of a storage structure 105 can include a plurality of fluid distribution devices 110, a fluid distribution system 150, a plurality of detectors 130, and a controller 120. The storage structure 105 can include densely packed storage structures (e.g., double-deep rack, push-back rack, pallet flow rack). The storage structure 105 can include rack arrangements (e.g., single-row racks, multi-row racks) and non-rack storage systems including for example: palletized, solid-piled (stacked commodities), bin box (storage in five-sided boxes with little to no space between boxes), shelf (storage on structures up to and including thirty inches deep and separated by aisles of at least thirty inches wide) or back-to-back shelf storage (two shelves separated by a vertical barrier with no longitudinal flue space and maximum storage height of fifteen feet).

The storage structure 105 can further include an automated storage and retrieval system (ASRS). The ASRS can be any of a number of automated storage and retrieval systems. For example, the ASRS can be a vertical carousel, horizontal carousel, vertical lift module, etc. The ASRS can be a high-piled storage system (in excess of twelve feet (12 ft)). The ASRS can be a densely packed structure comprising shafts and tracks for a computer implemented retrieval system to retrieve items or bins located throughout the structure.

The stored commodity in the storage structure 105 can include any one of NFPA-13 defined Class I, II, III or IV commodities, alternatively Group A, Group B, or Group C plastics, elastomers, and rubbers, or further in the alternative any type of commodity capable of having its combustion behavior characterized. With regard to the protection of Group A plastics, the systems and methods can be configured for the protection of expanded and exposed plastics. According to NFPA 13, Sec. 3.9.1.13, "Expanded (Foamed or Cellular) Plastics" is defined as "[t] hose plastics, the density of which is reduced by the presence of numerous small cavities (cells), interconnecting or not, disposed throughout the mass." Section 3.9.1.14 of NFPA 13 defines "Exposed Group A Plastic Commodities" as "[t] hose plastics not in packaging or coverings that absorb water or otherwise appreciably retard the burning hazard."

Figure 2:
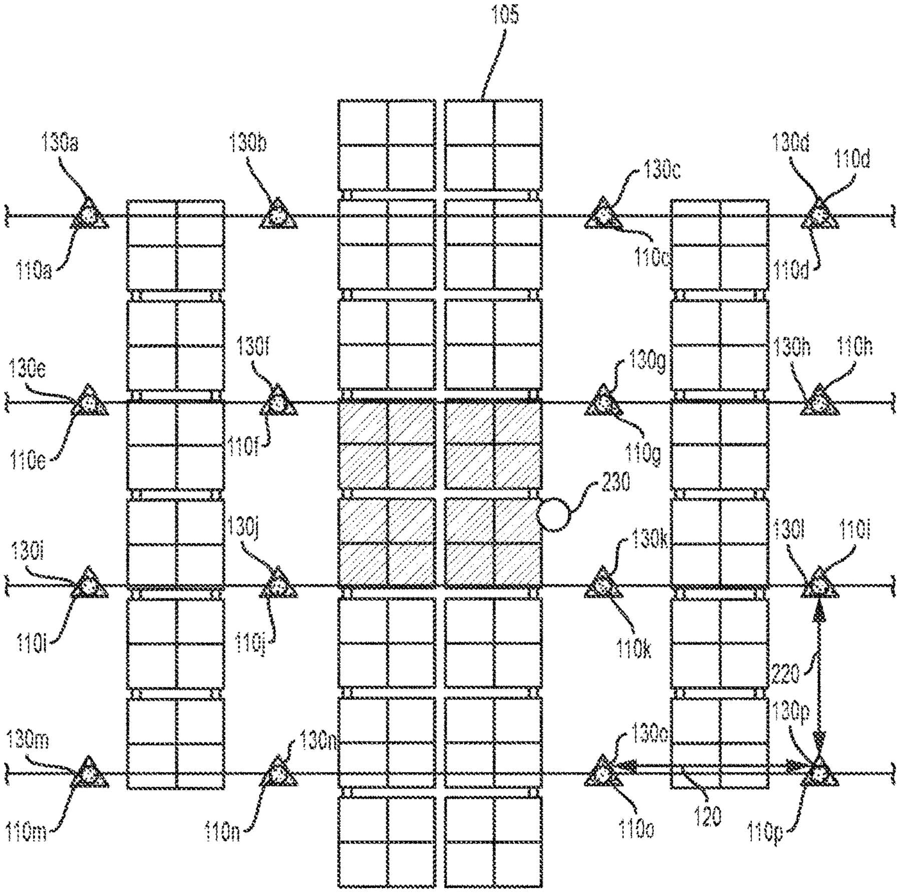
FIG. 2 is an illustration of an installation pattern for a ceiling-only fire protection of a storage structure.
Figure 3:
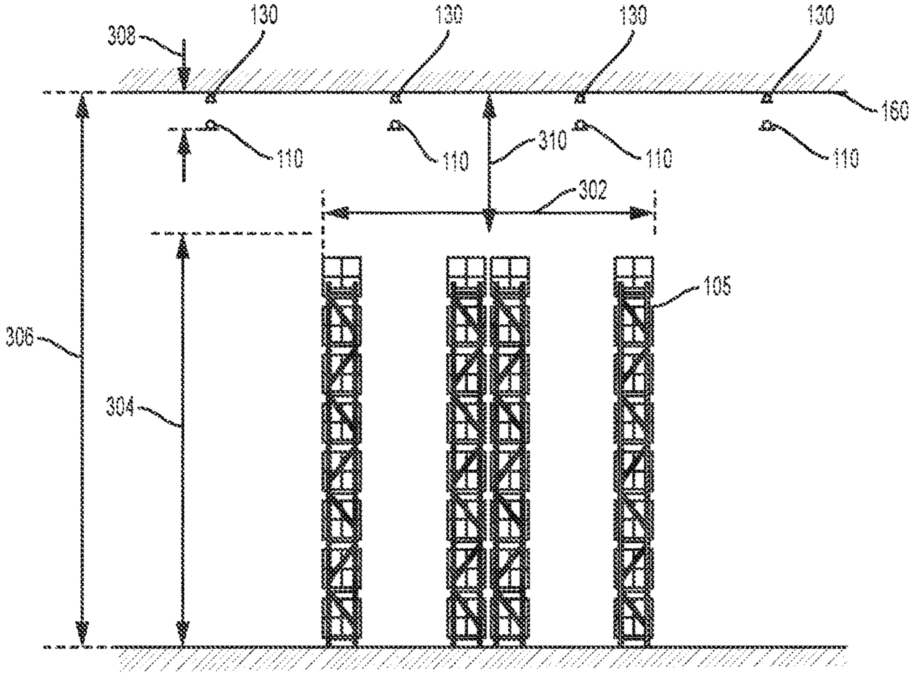
FIG. 3 is an illustration of an installation for a ceiling-only fire protection of a storage structure.

In the ceiling-only arrangement of the system 100, the fluid distribution devices 110 are installed between the ceiling 160 and a plane defined by the storage structure 105 as shown in FIGS. 1, 2, and 3. The fluid distribution devices 110 can be mounted or connected to the fluid distribution system 150. The fluid distribution system 150 includes a network of pipes having a portion suspended beneath the ceiling of the occupancy and above the storage structure 105 to be protected. The fluid distribution devices 110 can be electronic fluid distribution devices, as described below. The fluid distribution devices 110 can be electronically coupled with a detector 130 or the controller 120. The electronic coupling can be a wired or wireless connection. For example, the fluid distribution device 110 can be wired to a detector 130 to receive an actuation signal. In another example, the fluid distribution device 110 can be wirelessly connected (e.g., network connection, Bluetooth) to the controller 120 to receive an actuation signal.

The fluid distribution system 150 can include a network of pipes to provide for ceiling-only protection. The network of pipes can include one or more main pipes, connected to a water supply, from which one or more branch lines extend. The network of pipes connect the fluid distribution devices 110 to a supply of firefighting liquid such as, for example, a water main or water tank. The network of pipes can further include pipe fittings such as connectors, elbows, and risers, etc. to interconnect the distribution system 150 to the fluid distribution devices 110. The fluid distribution system 150 can further include additional devices (not shown) such as, for example, alarm valves, control valves, fire pumps, or backflow preventers to deliver the water to the distribution devices 110 at a desired flow rate or pressure. The fluid distribution system 150 further can include a riser pipe which can extend from the fluid supply to the pipe mains. The riser can include additional components or assemblies to direct, detect, measure, or control fluid flow through the fluid distribution system 150. For example, the system can include a check valve to prevent fluid flow from the sprinklers back toward the fluid source. The system can also include a flow meter for measuring the flow through the riser and the system 100. Moreover, the fluid distribution system 150 and the riser can include a fluid control valve, such as for example, a differential fluid-type fluid control valve. The fluid distribution system 150 of system 100 can be configured as a wet pipe system (fluid discharges immediately upon device operation) or a variation thereof including, i.e., non-interlocked, single or double interlock preaction systems (the system piping is initially filled with gas and then filled with the firefighting fluid in response to signaling from the detectors such that fluid discharges from the distribution devices at its working pressure upon device operation).

The plurality of detectors 130 in system 100 monitor the occupancy to detect changes for any one of temperature, thermal energy, spectral energy, smoke or any other parameter to indicate the presence of a fire in the occupancy. The detectors 130 can be arranged in a cross-zone detection orientation. For example, the plurality of detectors 130 in the system 100 can be separated into zones. A first zone can include temperature sensors and smoke detectors, wherein the smoke detectors are ionization smoke detectors. A second zone can include temperature sensors and smoke detectors, wherein the smoke detectors are photoelectric smoke detectors. A detection of smoke can be required from both zones to indicate a fire to ensure a fire has been sensed. One or more detectors 130 for monitoring of the storage occupancy are preferably disposed proximate the fluid distribution device 110 and more preferably disposed below and proximate to the ceiling 160. The detectors 130 can be mounted axially aligned with the fluid distribution device 110, as schematically shown in FIG. 3 or may alternatively be above and off-set from the distribution device 110, as schematically shown in FIG. 1. The detectors 130 can additionally be aligned differently based on the type of detectors 130. For example, the temperature sensor can be axially aligned with the fluid distribution device 110 and the smoke detector can be off-set, as shown in FIG. 2. Moreover, the detectors 130 can be located at the same or any differential elevation from the fluid distribution device 110 provided the detectors 130 are located above the commodity to support the ceiling-only protection. The detectors 130 are coupled with the controller 120 to communicate detection data or signals to the controller 120 of the system 100 for processing as described herein. The ability of the detectors 130 to monitor environmental changes indicative of a fire can depend upon the type of detector 130 being used, the sensitivity of the detector 130, coverage area of the detector 130, or the distance between the detector 130 and the fire origin. Accordingly, the detectors 130 individually and collectively are appropriately mounted, spaced or oriented to monitor the occupancy for the conditions of a fire in a manner described.

The plurality of detectors 130 can include a plurality of temperature sensors and a plurality of smoke detectors. The temperature sensors can include thermocouples, thermistors, infrared detectors, resistance temperature detectors (RTDs), and equivalents thereof. The plurality of smoke detectors can include ionization smoke detectors, photoelectric smoke detectors, optical beam smoke detector, and equivalents thereof. The system 100 can have an equivalent number of smoke detectors and temperature sensors. The system 100 can have more smoke detectors than temperature sensors. Alternatively, the system 100 can have more temperature sensors than smoke detectors.

The detectors 130 can provide a detection signal based on determining a threshold moment in fire growth. The threshold moment in fire growth can be a particular temperature (e.g., 145° F., 155° F., 165° F.), a rate of rise in temperature (e.g., 10° F./min, 20° F./min, 30° F./min), etc. The detection signal can be transmitted to the controller 120 by a connection 135. The detection signal can be an analog signal, digital signal, fiber optic signal, etc. The connection 135 can be any one or more of wired or wireless communication.

The detectors 130 can receive a control signal from the controller 120 and relay the control signal to a fluid distribution device 110. The signal can be received by the connection 135. The control signal can then be transmitted to the fluid distribution device 110 by the connection 115 between the detector 130 and the fluid distribution device 110. The control signal can also bypass the detector 130 and be transmitted directly from the controller 120 and the fluid distribution device 110.

The detectors 130 can provide a detection signal based on determining the presence of smoke. The signal can be transmitted to the controller by a connection 135. The detection signal can be an analog signal, digital signal, fiber optic signal, etc. The connection 135 can be any one or more of wired or wireless communication.

Shown in FIG. 2, among others, is a plan view of the ceiling-only system 100 disposed above a storage structure 105. Shown in particular is a grid of fluid distribution devices 110*a*-110*p* connected in horizontal rows by branches of the fluid distribution system 150, detectors 130*a*-130*p*, and a second arrangement of detectors 130 representing smoke detectors in this instance.

The grid pattern of the fluid distribution devices 110 and the detectors 130 allows the controller 120 to simply identify adjacency. For example, detector 130*f* may be a focal point, as described below. In this instance detector 130*b* can be considered a detector located to the north of 130*f*, 130*c* can be considered a detector located to the north-east of 130*f*. In another example, 130*g* can be a focal point. In this instance, detector 130*b* would be a detector to the north-west of the focal point. North, in this instance can be true north. North, can be any other polar direction, as directions (e.g., north, south, east, west, north-east) can be used as a simple way to denote adjacency as can be referenced by the controller 120. In some instances, this can be denoted in other ways (e.g., up, down, left, right). Due to the orientation of the detectors 130 and associated fluid distribution devices 110, the controller 120 can determine adjacency and address particular detectors 130 and fluid distribution devices 110 individually based on their respective locations in the grid pattern.

The fluid distribution devices 110 or detectors 130 can be spaced along branches of the fluid distribution system 150 at a width 210. The width 210 can range from a distance of 8 ft. to 12 ft. The width 210 can be 10 ft. The branches of the fluid distribution system 150 can be spaced at depth 220. The depth 220 can range from a distance of 8 ft. to 12 ft. The depth 220 can be 10 ft.

The fire 230 shows a particular location where a fire can occur. The fire 230 can be ignited by a number of means (e.g., electrical shortage, battery overheating, chemical reactions, arson). In the position shown, the fire 230 can be covered by a discharge array above and about the fire 230 including at least fluid distribution devices 110*f*, 110*g*, 110*j*, and 110*k*. A discharge array about a fire 230 can be any discharge array that fully encloses the fire 230.

Shown in FIG. 3, among others, is a plan view of a ceiling-only system 100 disposed above a storage structure 105. Shown in particular is a side view of the ceiling-only system 100 disposed above a storage structure 105. The detectors 130, which can include temperature sensors and smoke detectors, can be disposed beneath the ceiling 160 and above the fluid distribution devices 110. The detectors 130 can be disposed a distance of 0 inches to 6 inches beneath the ceiling 160. The fluid distribution devices 110 can be disposed a distance 308 beneath the detectors 130. The distance 308 can be 0 inches to 36 inches.

As shown in FIG. 3, among others, the detectors 130 and the fluid distribution devices 110 are aligned axially. The fluid distribution devices 110 can be off-set from the detectors 130 a distance ranging from 0 inches to 6 inches. The fluid distribution devices 110 can be off-set from the detectors 130 a distance ranging from 0 inches to 18 inches.

The ceiling 160 of the occupancy can be of any configuration including any one of: a flat ceiling, horizontal ceiling, sloped ceiling or combinations thereof. The ceiling height 306 is preferably defined by the distance between the floor of the storage occupancy and the underside of the ceiling 160 above (or roof deck) within the storage area to be protected, and more preferably defines the maximum height between the floor and the underside of the ceiling 160 above (or roof deck). The plurality of fluid distribution devices 110 can be stored to a storage height 304, in which the storage height 304 preferably defines the maximum height of the storage and a nominal ceiling-to-storage clearance 310 between the ceiling and the top of the highest stored commodity. The ceiling height 306 can be twenty feet or greater, and can be thirty feet or greater, for example, up to a nominal forty-five feet (45 ft.) or higher such as for example up to a nominal fifty feet (50 ft.), fifty-five (55 ft.), sixty feet (60 ft.) or even greater and in particular up to sixty-five feet (65 ft.). Accordingly, the storage height 304 can be twelve feet or greater and can be nominally twenty feet or greater, such as for example, a nominal twenty-five feet (25 ft.) up to a nominal sixty feet or greater, preferably ranging nominally from between twenty feet and sixty feet. For example, the storage height can be up to a maximum nominal storage height 304 of forty-five feet (45 ft.), fifty feet (50 ft.), fifty-five (55 ft.), or sixty feet (60 ft.). Additionally or alternatively, the storage height 304 can be maximized beneath the ceiling 160 to preferably define a minimum nominal ceiling-to-storage clearance 310 of any one of one foot, two feet, three feet, four feet, or five feet or anywhere in between.

Figure 4:
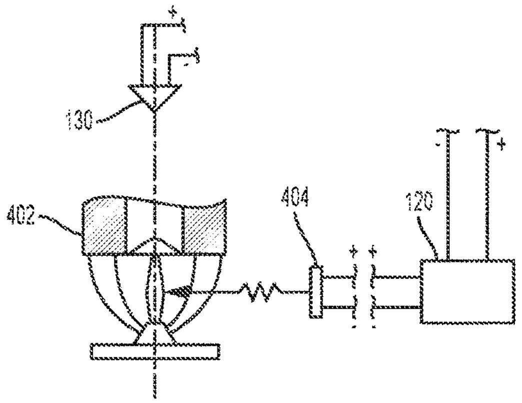
FIG. 4 is a schematic illustration of a fluid distribution device for use in the ceiling-only fire protection of a storage structure.
Figure 5:
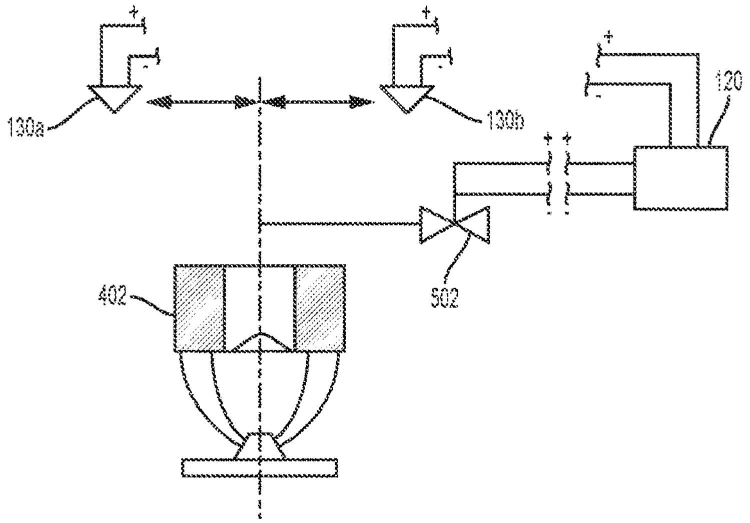
FIG. 5 is a schematic illustration of a fluid distribution device for use in the ceiling-only fire protection of a storage structure.

The fluid distribution device 110 can include a deflecting member coupled with a frame body as schematically shown in FIGS. 4 and 5. The frame body includes an inlet for connection to the piping network and an outlet with an internal passageway extending between the inlet and the outlet. The deflecting member can be axially spaced from the outlet in a fixed spaced relation. Water or other firefighting fluid delivered to the inlet is discharged from the outlet to impact the deflecting member. The deflecting member distributes the firefighting fluid to deliver a volumetric flow which contributes to the preferred collective volumetric flow to address and more preferably extinguish a fire. Alternatively, the deflecting member can translate with respect to the outlet provided it distribute the firefighting fluid in a desired manner upon operation. In the ceiling-only systems described herein, the fluid distribution device 110 can be installed such that its deflecting member is located from the ceiling at a desired deflector-to-ceiling distance 310 as schematically shown in FIG. 3. Alternatively, the device 110 can be installed at any distance from the ceiling 160 provided the installation locates the device above the storage structure 105 being protected in a ceiling-only configuration.

Accordingly, the fluid distribution device 110 can be structurally embodied with a frame body and deflector member of a "fire protection sprinkler" as understood in the art and appropriately configured or modified for controlled actuation as described herein. This configuration can include the frame and deflector of known fire protection sprinklers with modifications described herein. The sprinkler frame and deflectors components for use in the preferred systems and methods can include the components of known sprinklers that have been tested and found by industry accepted organizations to be acceptable for a specified sprinkler performance, such as for example, standard spray, suppression, or extended coverage and equivalents thereof. For example, a fluid distribution device 110 for installation in the system 100 can include a frame body and deflector member having a nominal 25.2 K-factor and configured for electrically controlled operation.

As used herein, the K-factor is defined as a constant representing the sprinkler discharge coefficient, that is quantified by the flow of fluid in gallons per minute (GPM) from the sprinkler outlet divided by the square root of the pressure of the flow of fluid fed into the inlet of the sprinkler passageway in pounds per square inch (PSI). The K-factor is expressed as GPM/(PSI)$^{1/2}$. NFPA 13 provides for a rated or nominal K-factor or rated discharge coefficient of a sprinkler as a mean value over a K-factor range. For example, for a K-factor 14 or greater, NFPA 13 provides the following nominal K-factors (with the K-factor range shown in parenthesis): (i) 14.0 (13.5-14.5) GPM/(PSI)$^{1/2}$; (ii) 16.8 (16.0-17.6) GPM/(PSI)$^{1/2}$; (iii) 19.6 (18.6-20.6) GPM/(PSI)$^{1/2}$; (iv) 22.4 (21.3-23.5) GPM/(PSI)$^{1/2}$; (v) 25.2 (23.9-26.5) GPM/(PSI)$^{1/2}$; (vi) 28.0 (26.6-29.4) GPM/(PSI)$^{1/2}$; and (vii) 30.8 (29.2-32.4) GPM/(PSI)$^{1/2}$; or a nominal K-factor of 33.6 GPM/(PSI)$^{1/2}$ which ranges from about (31.8-34.8 GPM/(PSI)$^{1/2}$). Alternate embodiments of the fluid distribution device 110 can include sprinklers having the aforementioned nominal K-factors or greater.

The fluid distribution device 110 can be an early suppression fast response sprinkler (ESFR) frame body and deflecting member or deflector for use in the systems and methods described herein. The fluid distribution devices 110 can be pendent-type sprinklers; however upright-type sprinklers can be configured or modified for use in the systems described herein. Alternate embodiments of the fluid distribution devices 110 for use in the system 100 can include nozzles, misting devices or any other devices configured for controlled operation to distribute a volumetric flow of firefighting fluid in a manner described herein.

The distribution devices 110 of the system 100 can include a sealing assembly or other internal valve structure disposed and supported within the outlet to control the discharge from the distribution device 110. However, the operation of the fluid distribution device 110 or sprinkler for discharge is not directly or primarily triggered or operated by a thermal or heat-activated response to a fire in the storage occupancy. Instead, the operation of the fluid distribution devices 110 is controlled by the preferred controller 120 of the system in a manner as described herein. More specifically, the fluid distribution devices 110 are coupled directly or indirectly with the controller 120 to control fluid discharge and distribution from the device 110. Shown in FIGS. 4 and 5 are schematic representations of preferred electro-mechanical coupling arrangements between a distribution device assembly 110 and the controller. Shown in FIG. 4 is a fluid distribution device assembly 110 that includes a sprinkler frame body 402 having an internal sealing assembly supported in place by a removable structure, such as for example, a thermally responsive glass bulb trigger or a mechanism that uses a solid link. A transducer and preferably electrically operated actuator 404 is arranged, coupled, or assembled, internally or externally, with the sprinkler 402 for displacing the support structure by fracturing, rupturing, ejecting, or otherwise removing the support structure and its support of the sealing assembly to permit fluid discharge from the sprinkler. The actuator 404 can be electrically coupled with the controller 120 in which the controller provides, directly or indirectly, an electrical pulse or signal for signaled operation of the actuator to displace the support structure and the sealing assembly for controlled discharge of firefighting fluid from the sprinkler 402.

Distribution device electromechanical arrangements for use in the system 100 can include a sprinkler and electrically responsive explosive actuator arrangement in which a detonator is electrically operated to displace a slidable plunger to rupture a bulb supporting a valve closure in the sprinkler head. The distribution device electromechanical arrangements for use in the system can include a sensitive sprinkler having an outlet orifice with a rupture disc valve upstream of the orifice. An electrically responsive explosive squib is provided with electrically conductive wires that can be coupled with the controller 120. Upon receipt of an appropriate signal, the squib explodes to generate an expanding gas to rupture disc to open the sprinkler. The distribution device electromechanical arrangements for use in the system can include an electrically controlled fluid dispenser for a fire extinguishing system in which the dispenser includes a valve disc supported by a frangible safety device to close the outlet orifice of the dispenser. A striking mechanism having an electrical lead is supported against the frangible safety device. An electrical pulse can be sent through the lead to release the striking mechanism and fracture the safety device thereby removing support for the valve disc to permit extinguishment to flow from the dispenser.

Shown in FIG. 5, is an electromechanical arrangement for controlled actuation that includes an electrically operated solenoid valve 502 in line and upstream from an open sprinkler or other frame body 402 to control the discharge from the device frame. With no seal assembly in the frame outlet, water is permitted to flow from the open sprinkler frame body 402 upon the solenoid valve 502 receiving an appropriately configured electrical signal from the controller 120 to open the solenoid valve depending upon whether the solenoid valve is normally closed or normally open. The valve 502 can be located relative to the frame body 402 such that there is negligible delay in delivering fluid to the frame inlet at its working pressure upon opening the valve 502. In one particular solenoid valve arrangement in which there is a one-to-one ratio of valve to frame body, the system can effectively provide for controlled micro-deluge systems to address and more preferably extinguish a fire thereby further limiting and more preferably reducing damage to the occupancy and stored commodity as compared to known deluge arrangements.

Figure 6:
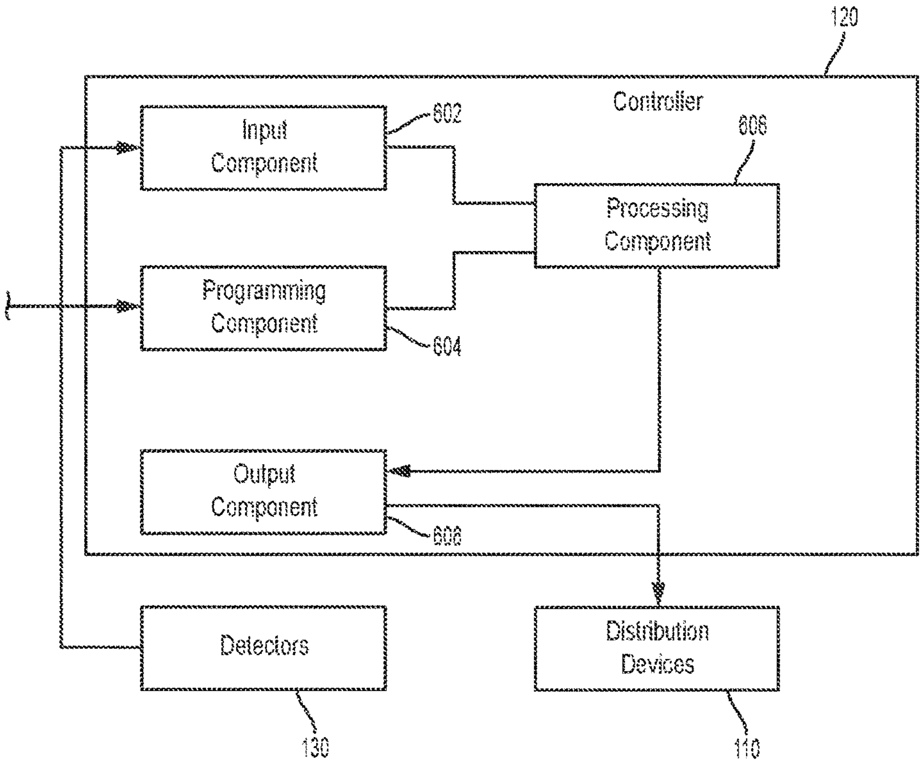
FIG. 6 is a schematic illustration of a controller for use in a ceiling-only fire protection of a storage structure.

As shown in FIG. 6, among others, the controller 120 can be structured for receiving, processing, and generating the various input and output signals from or to each of the detectors 130 and fluid distribution devices 110. Functionally, the preferred controller 120 includes a data input component 602, a programming component 604, a processing component 606 and an output component 608. The data input component 602 receives detection data or signals from the detectors 130. The detection data or signals including, for example, either raw detector data or calibrated data, such as for example, any one of continuous or intermittent temperature data, spectral energy data, smoke data or the raw electrical signals representing such parameters, e.g., voltage, current or digital signal, that would indicate a measured environmental parameter of the occupancy. Additional data parameters collected from the detectors 130 can include time data, address or location data of the detector 130. The location data can include the detected magnitude of a locating signal (e.g., ultra wideband, infrared) transmitted by another detector 130. The locating signal, as discussed herein, can be sensed by multiple detectors 130 to determine the relative position or adjacency of the detectors 130 utilizing a trilateration process. The locating signal can include a time delay between transmission and detection to triangulate the relative position or adjacency of the detectors 130. The programming component 604 provides for input of user defined parameters, criteria or rules that can define detection of a fire, the location of the fire, the profile of the fire, the magnitude of the fire or a threshold moment in the fire growth. Moreover, the programming component 604 can provide for input of select or user-defined parameters, criteria or rules to identify fluid distribution devices or assemblies 110 for operation in response to the detected fire, including one or more of the following: defining relations between distribution devices 110, e.g., proximity, adjacency, etc., define limits on the number of devices to be operated, i.e., maximum and minimums, the time of operation, the sequence of operation, pattern or geometry of devices for operation, their rate of discharge; or defining associations or relations to detectors. As provided in the control methodologies described herein, detectors 130 including temperature sensors or smoke detectors can be associated with fluid distribution devices 110 on a one-to-one basis or alternatively detectors 130 can be associated with more than one fluid distribution device 110. Additionally, the input component 602 or programming component 604 can provide for feedback or addressing between the fluid distribution devices 110 and the controller 120 for carrying out the methodologies of the distribution devices in a manner described herein.

Accordingly, the preferred processing component 606 processes the input and parameters from the input component 602 and programming component 604 to detect and locate a fire, and select, prioritize or identify the fluid distribution devices 110 for controlled operation in a preferred manner. For example, the preferred processing component 606 generally determines when a threshold moment is achieved; and with the output component 608 of the controller 120 generates appropriate signals to control operation of the identified and preferably addressable distribution devices 110 preferably in accordance with one or more methodologies described herein. The programming may be hard wired or logically programmed and the signals between system components can be one or more of analog, digital, or fiber optic data. Moreover communication between components, for example connections 115 or 135 of the system 100 can be any one or more of wired or wireless communication.

Figure 7:
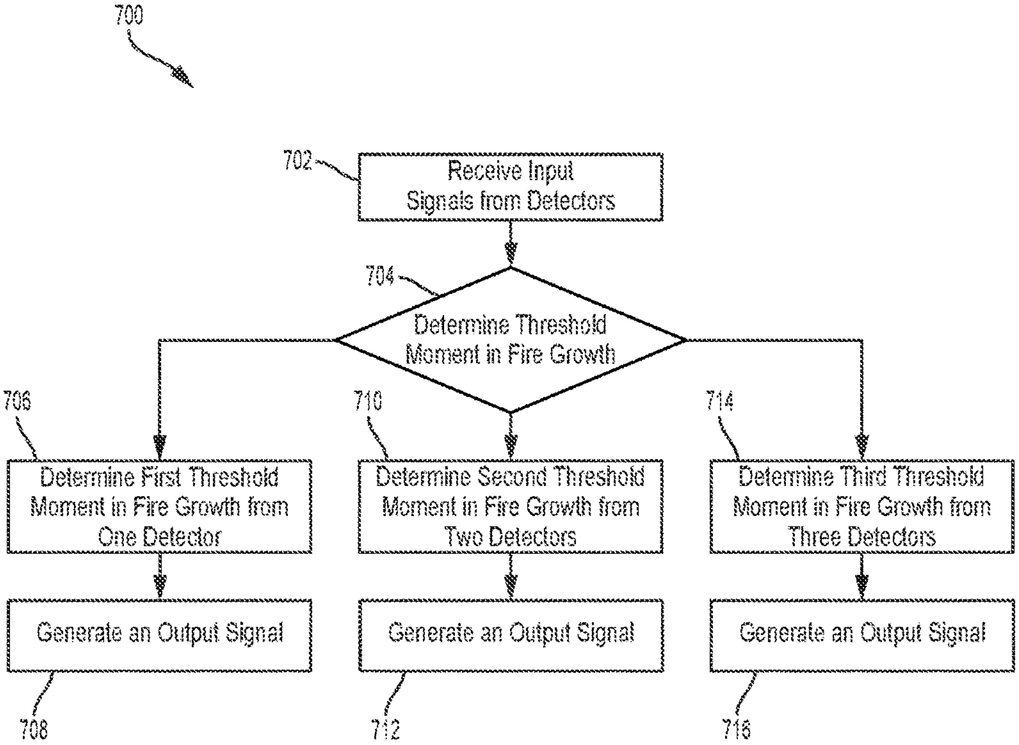
FIG. 7 is a flow diagram depicting a method of extinguishing a fire.
Figure 10:
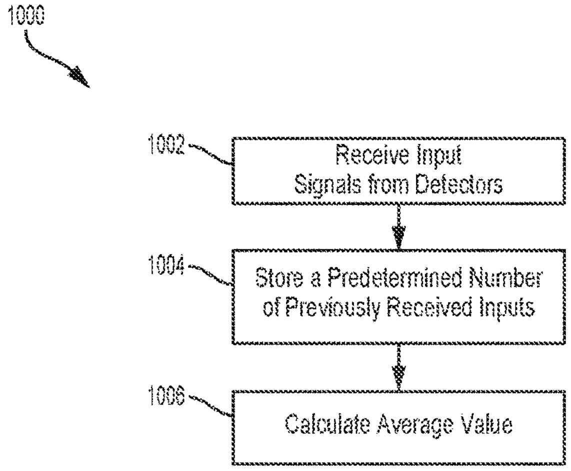
FIG. 10 is a flow diagram depicting a method of determining a moving average detector input value.

Shown in FIG. 7, among others, is a flowchart of a fire suppression methodology of the controller 120 of the system 100. In a first act 702, the controller 120 receives input signals from the detectors 130. The controller 120 processes the data to determine the presence of a fire 230 in act 704, based on receiving a threshold moment in fire growth signal. The threshold moment in fire growth can be based on sudden change in the sensed data from the detectors, such as for example, a sudden increase in temperature, spectral energy or other measured parameters. The threshold moment in fire growth can be a rate of temperature increase (e.g., 10° F./min, 20° F./min, 30° F./min) sensed by the detector 130. The rate of temperature increase can be a predetermined rate of temperature increase as set by an operator. The threshold moment in fire growth can be a particular temperature (e.g., 145° F., 155° F., 165° F.) sensed by a detector 130. The particular temperature can be a predetermined temperature as set by an operator. The threshold moment in fire growth can be a determination of fire from a detector 130. The threshold moment in fire growth can be determined by a combination of the instantaneous temperature and the rate of temperature rise, as described herein with respect to FIG. 8. The threshold moment in fire growth can be determined by a rolling average of the instantaneous temperature or rate of temperature rise being greater than a determined threshold, as described herein with respect to FIG. 10.

The controller can determine the threshold moment of fire growth that has been met and by how many detectors 130 at act 704. The threshold moment in fire growth can be set to differing levels based on the number of detectors 130 that are determined to sense the threshold moment in fire growth. For example, the controller 120 can determine a first threshold moment in fire growth has been met by a single detector 130, a second threshold moment in fire growth has been met by two adjacent detectors 130, or a third threshold moment in fire growth has been met by three adjacent detectors 130. As described herein, two detectors 130 or fluid distribution devices 110 can be adjacent if the second detector 130 or fluid distribution device 110 is located to the north, south, east, west, north-east, north-west, south-east, or south-west of the first detector 130 or fluid distribution device 110. The first threshold moment in fire growth can be greater than the second threshold moment in fire growth, which can be greater than the third threshold moment in fire growth. For example, a first threshold moment in fire growth can be rate of temperature rise of 40° F./min, a second threshold moment in fire growth can be a rate of temperature rise of 30° F./min, and a third threshold moment in fire growth can be a rate of temperature rise of 20° F./min. These are examples of differing threshold moments in fire growth and there are many other possibilities. For example, the temperature required for a first threshold moment in fire growth can be greater than or equal to the second threshold moment in fire growth and the third threshold moment in fire growth. For example, the temperature required for a second threshold moment in fire growth can be greater than or equal to the third threshold moment in fire growth.

Upon determining a first threshold moment in fire growth has been detected by a single detector 130 at act 706, the controller 120 can generate a control signal for a fluid distribution device 110 associated with the detector 130 that first sensed the threshold moment in fire growth and all fluid distribution devices 110 immediately surrounding the fluid distribution device 110 associated with the detector 130 that first sensed the threshold moment in fire growth. For example, referring to FIG. 2, if a threshold moment in fire growth is detected by detector 130*k*, the fluid distribution devices 110*f*, 110*g*, 110*h*, 110*j*, 110*k*, 110*l*, 110*n*, 110*o*, and 110*p* can be activated to suppress the fire 230.

Upon determining a second threshold moment in fire growth has been detected by two adjacent detectors 130 at act 710, the method can continue to act 712, wherein the controller 120 can generate a control signal for the two fluid distribution devices 110 associated with the two adjacent detectors 130 and the fluid distribution devices 110 surrounding the two fluid distribution devices 110. For example, again referring to FIG. 2, if a second threshold moment in fire growth is detected by adjacent detectors 130*k* and 130*j*, the fluid distribution devices 110*k* and 110*j* can receive a control signal, as well as the fluid distribution devices 110 surrounding the two fluid distribution devices 110*k* and 110*j* including 110*e*, 110*f*, 110*g*, 110*h*, 110*i*, 110*l*, 110*m*, 110*n*, 110*o*, and 110*p*.

Upon determining a third threshold moment in fire growth has been detected by three or four adjacent detectors 130 at act 714, the method can continue to act 716, wherein the controller 120 can determine center points for generating a control signal. The center points can be the detector 130 of the three or four adjacent detectors 130 with the highest detector value (e.g., highest rate of temperature rise, highest temperature) and the detector 130 diagonally adjacent to the detector 130 with the highest detector value. Upon determining the center points, the controller 120 can generate a control signal for the two fluid distribution devices 110 associated with the two detectors 130 determined to be center points and the fluid distribution devices 110 surrounding the two fluid distribution devices 110. For example, again referring to FIG. 2, if a third threshold moment in fire growth is detected by adjacent detectors 130*f*, 130*g*, 130*j*, and 130*k*, the controller 120 can determine that 130*k* has the highest detector value. Based on this determination, the controller 120 can set 130*k* and 130*f*, which is diagonally adjacent to 130*k*, as center points. The controller 120 can further generate a control signal for the fluid distribution devices 110*k* and 110*f* as well as the fluid distribution devices 110 surrounding the two fluid distribution devices 110*k* and 110*f* including 110*a*, 110*b*, 110*c*, 110*e*, 110*g*, 110*h*, 110*i*, 110*j*, 110*l*, 110*n*, 110*o*, and 110*p*.

Figure 8:
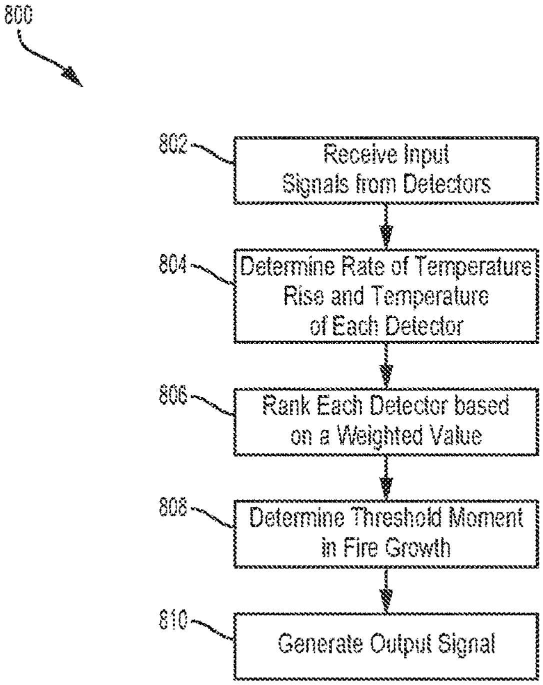
FIG. 8 is a flow diagram depicting a method of extinguishing a fire.

Shown in FIG. 8, among others, is a flowchart of a fire suppression methodology of the controller 120 of the system 100. In a first act 802, the controller 120 receives input signals from the detectors 130. The signals can be analog or digital signals. At act 804, the controller 120 can determine a rate of temperature rise and a temperature for each detector 130 based on the received input signals. Based on the determined rate of temperature rise and temperature detected by each detector 130 a weighted value can be calculated for each detector 130 at act 806. A user can assign weights (e.g., multipliers) to the rate of temperature rise and temperature at the initial installation of the system 100 or update the assigned weights at any time through the controller 120. Based on the calculated weighted value, the detectors 130 can be ranked from greatest weighted value to lowest weighted value.

At act 808, the controller 120 can determine a threshold moment in fire growth has been reached by a detector by comparing the weighted values with a preset threshold moment in fire growth value. A user can set that a predetermined number of detectors must detect a certain weighted value prior to a threshold moment in fire growth being determined. For example, the controller 120 can require that the weighted value of three detectors must meet or exceed a threshold moment in fire growth value before a threshold moment in fire growth is determined. The controller 120 can further have a set first threshold moment in fire growth value and a second threshold moment in fire growth value, where in the second threshold moment in fire growth value is less than the first threshold moment in fire growth value. For example, a weighted value of a first detector 130 can exceed a first threshold moment in fire growth value then the controller 120 can wait until a set number of additional detectors 130 meet or exceed a second threshold moment in fire growth value to indicate a threshold moment in fire growth has been met, and proceed to act 810.

At act 810, the controller 120 can generate an a control signal for the one or more fluid distribution devices 110 associated with the one or more detectors 130 that have weighted values that meet or exceed a first or second threshold moment in fire growth value. The controller 120 can further generate control signals for the fluid distribution devices 110 surrounding the one or more fluid distribution devices 110 associated with the one or more detectors 130 that have weighted values that meet or exceed a first or second threshold moment in fire growth value. Acts 802-808 can be used in a number of other fire suppression methodologies as a method for determining a threshold moment in fire growth. For example, acts 802-808 can be integrated into the fire suppression methodology of method 700 such that acts 802-808 are completed which proceeds to act 704 of method 700. This is an example method, and many other methods utilizing acts 802-808 of methodology 800 are possible.

The controller 120 can have a preset number of detectors 130 that can cause the controller 120 to generate a control signal. For example, a user can set via the controller 120 that the top three ranked weighted values can cause the controller 120 to generate a control signal. Hence, the fluid distribution devices 110 associate with the detectors 130 with the top three ranking weighted values, and the fluid distribution devices 110 surrounding the fluid distribution devices 110 associated with the detectors 130 with the top three ranking weighted values can receive control signals. This is a particular example, and it should be appreciated that there a number of other possible configurations and methods for generating control signals based on the ranked weighted values.

Figure 9:
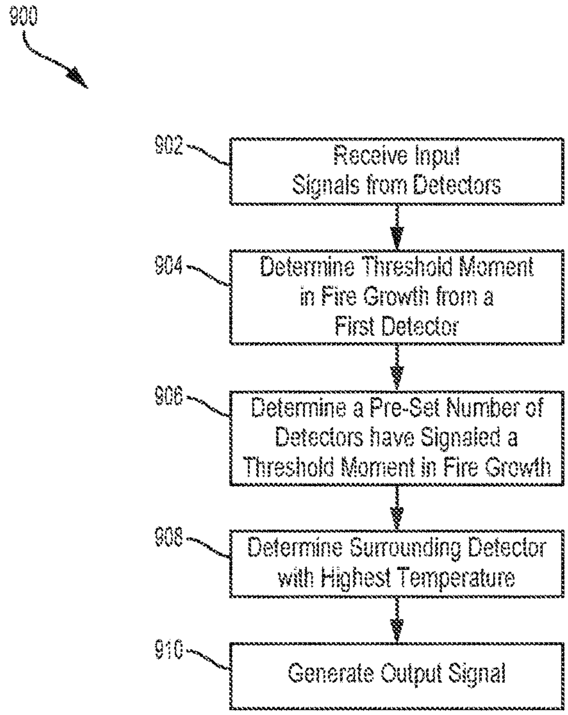
FIG. 9 is a flow diagram depicting a method of extinguishing a fire.

Shown in FIG. 9, among others, is a flowchart of a fire suppression methodology of the controller 120 of the system 100. In a first act 902, the controller 120 receives input signals from the detectors 130. The signals can be analog or digital signals. At act 904, the controller 120 can determine a rate of temperature rise or a temperature for each detector 130 based on the received input signals. Based on the received input signals, the controller 120 can determine a first detector 130 has reached or exceeded a threshold moment in fire growth. The threshold moment in fire growth can be determined by a combination of the instantaneous temperature and the rate of temperature rise, as described herein with respect to FIG. 8. The threshold moment in fire growth can be determined by a rolling average of the instantaneous temperature or rate of temperature rise being greater than a determined threshold, as described herein with respect to FIG. 10. At act 906, the controller 120 can wait until a pre-set number of detectors 130 have signaled a threshold moment in fire growth. The threshold moment in fire growth for the pre-set number of detectors 130 after a first detector 130 can be a second threshold moment in fire growth. The second threshold moment in fire growth can be lower (e.g., lower rate in temperature rise, lower temperature) than the threshold moment in fire growth as required by a first detector 130. At act 906, the controller 120 can determine the detector 130 of the detectors 130 to meet or exceed the threshold moment in fire growth, with the greatest rate of temperature rise or temperature. The detector 130 with the greatest rate of temperature rise or temperature can be considered the first detector 130.

At act 908, the controller 120 can determine a detector 130 with a greatest rate of temperature rise or temperature surrounding the first detector 130. The detectors surrounding the first detector can include detectors to the north-west, north, north-east, west, east, south-west, south, and south-east. For example, referring to FIG. 2, if the first detector 130 is determined to be 130*f*, the controller can compare the rate of temperature rise or temperature of detectors 130*a*, 130*b*, 130*c*, 130*e*, 130*g*, 130*i*, 130*j*, and 130*k*. Between act 906 and act 908, the controller 120 can halt operation for a predetermined period of time, as set by a user to allow for the detectors 130 to more accurately determine rate of temperature rise or temperature. This may be beneficial as a more accurate location of the fire can be determined if operations are halted for a period of time between determining a first detector 130 and a second detector 130.

Upon determining a second detector 130 with the greatest rate of temperature rise or temperature surrounding the first detector 130, the controller can generate a control signal for the fluid distribution devices 110 associated with the first and second detectors 130 and the fluid distribution devices 110 surrounding the fluid distribution devices 110 associated with the first and second detectors 130. For example, again referring to FIG. 2, if the first detector is 130*f*, and the detector 130 with the greatest rate of temperature rise or temperature surrounding the first detector is 130*g*, the controller 120 will generate a control signal for 110*a*, 110*b*, 110*c*, 110*d*, 110*e*, 110*f*, 110*g*, 110*h*, 110*i*, 110*j*, 110*k*, and 110*l*. The control FIG. 10, among others, refers to a method of determining a moving average detector input value. The moving average can also be referred to as a rolling average. Method 1000 can be utilized in the fire suppression methods described herein as a method for averaging the data as it is received to ensure spikes in received inputs do not result in "false alarms". In a first act 1002, the controller 120 receives input signals from the detectors 130. The signals can be analog or digital signals. At act 1004 the controller 120 can store a predetermined number (e.g., 3, 5, 10, 50) of previously received inputs from the detectors 130. Upon receiving new input values from the detectors 130, the oldest value for each detector 130 is deleted maintaining the predetermined number of previously received inputs. At act 1006 an average value for each detector 130 is calculated by the controller 120. The average can be determined by calculating the sum of all of the stored values and dividing by the number of stored values for each detector 130. As described herein method 1000 can be utilized in various fire suppression methods described herein and others not described herein. For example, acts 1002-1006 can be used with method 900 such that upon act 1005 can be followed by acts 904-910 of method 900. This is an example methodology, and many further methodologies are conceivable utilizing acts 1002-1006.

Figure 11:
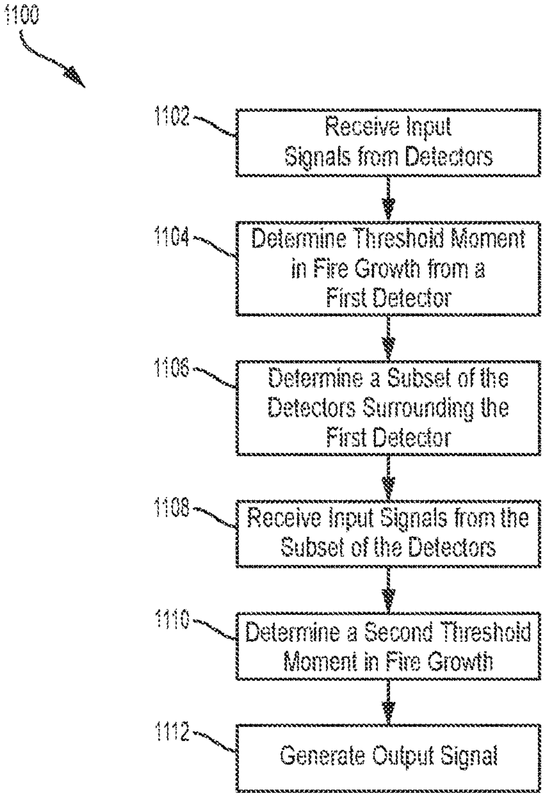
FIG. 11 is a flow diagram depicting a method of extinguishing a fire.

FIG. 11, among others refers to a flowchart of a fire suppression methodology of the controller 120 of the system 100. In a first act 1102, the controller 120 receives input signals at a first frequency (e.g., one input per second, one input every five seconds) from the detectors 130. The signals can be analog or digital signals. At act 1104, based on the received input signals, the controller 120 can determine a threshold moment in fire growth has been met by a first detector 130. The threshold moment in fire growth can be determined by a combination of the instantaneous temperature and the rate of temperature rise, as described herein with respect to FIG. 8. The threshold moment in fire growth can be determined by a rolling average of the instantaneous temperature or rate of temperature rise being greater than a determined threshold, as described herein with respect to FIG. 10. At act 1106, based on the determined threshold moment in fire growth being met by the first detector 130, a subset of the detectors 130 can be determined surrounding the first detector. The subset can include, for example, a five by five block of detectors 130, wherein the first detector is centered within the five by five block of detectors 130. It should be appreciated that there are many other configurations possible. For example, the subset can include a seven by seven block of detectors 130, or a three by three block of detectors 130, wherein the first detector is centered within the block of detectors 130. In another example, the block of detectors 130 can be a rectangular shape (e.g., one by three, three by five, four by seven), or a subset of detectors 130 determined to be within a preset distance of the first detector 130 (e.g., 10 feet, 25 feet, 50 feet).

At act 1108, the controller 120 can receive inputs from the subset of detectors 130 as determined at act 1106. The controller 120 can receive the inputs from the subset of detectors 130 at a second frequency, which can be higher than the first frequency. The second frequency can be lower than the first frequency or equal to the first frequency.

At act 1110, the controller can analyze the inputs received at act 1108 from the subset of the detectors 130. The received inputs can be analyzed in more complex ways than the inputs received from all of the detectors as less computing can be required due to the lesser number of detectors 130 the controller 120 is receiving inputs from. The controller can compare the received inputs from each detector 130 of the subset of detectors 130 to the inputs received from adjacent detectors 130. This can be beneficial as the controller 120 can compare the inputs (e.g., rate of temperature rise, temperature) from each of the detectors 130 of the subset of detectors 130 to more accurately determine the location of the fire.

The method of determining a subset of the detectors 130 to allow for more complex operations can be utilized in the methods for extinguishing a fire as described herein. In one example, at act 1110 the controller 120 can determine two adjacent detectors 130 with the greatest received inputs (e.g., rate of temperature rise, temperature). Based on the determination of two adjacent detectors 130 with the greatest inputs the controller 120 can generate a control signal at act 1112. The control signal can be transmitted to the fluid distribution devices 110 associate with the two adjacent detectors 130 with the greatest inputs, and the fluid distribution devices surrounding the two fluid distribution devices 110. For example, again referring to FIG. 2, if the two adjacent detectors with the greatest inputs are determined to be 130*f* and 130*g*, the controller 120 can generate a control signal for fluid distribution devices 110*a*, 110*b*, 110*c*, 110*d*, 110*e*, 110*f*, 110*g*, 110*h*, 110*i*, 110*j*, 110*k*, and 110*l*.

Acts 1102-1110 can be used in a number of other fire suppression methodologies as a method for determining a subset of detectors to determine a first or second threshold moment in fire growth. For example, acts 1102-1110 can be integrated into the fire suppression methodology of method 700 such that acts 1102-1110 are completed which proceeds to act 704 of method 700. This is an example method, and many other methods utilizing acts 1102-1110 of methodology 1110 are possible.

Figure 12:
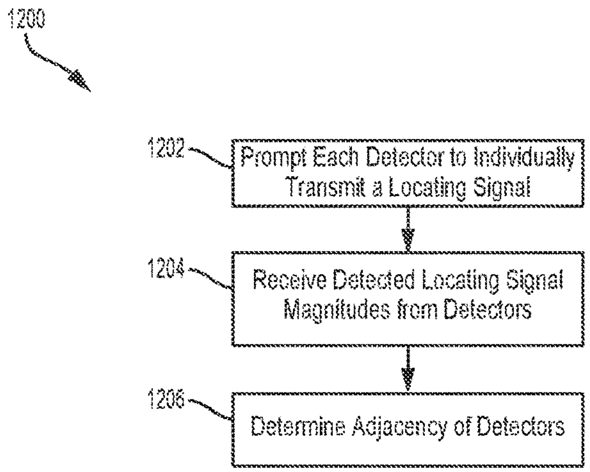
FIG. 12 is a flow diagram depicting a method of detector trilateration.

FIG. 12, among others, refers to a method of detector 130 trilateration of the controller 120 of the system 100. The method 1200 can be utilized in any of the fire extinguishing methods described herein as a method for determining adjacency of the detectors 130 arranged in a grid pattern. The detectors can be arranged in a non-grid pattern. Each detector 130 can be assigned a distinctive identifier (e.g., numeric identifier, alphanumeric identifier) at manufacture. The method 1200 can be implemented upon installation to determine adjacency of the detectors. The method 1200 can be implemented at a yearly basis to ensure correct adjacency is held by the controller. It should be appreciated that the method can be utilized in many instances to complete a function of determining adjacency (e.g., relative location) of the detectors 130.

In a first act 1202, the controller 120 can transmit a signal to each detector 130 individually prompting the detectors 130 to transmit a locating signal at a predetermined magnitude. The locating signal transmitted by the detector 130 can be any appropriate signal to determine distances between detectors 130 (e.g., infrared, ultra wideband). The controller 120 can signal for individual detectors to transmit locating signals independently. This can be beneficial as the method can be completed in an iterative manner ensuring signals aren't crossed leading to false location determinations. A first detector 130 with a first identifier can transmit a locating signal at a predetermined magnitude.

At act 1204, surrounding detectors 130 can detect the locating signal from the first detector 130 at a lesser magnitude and transmit the detected lesser magnitude to the controller 120 with the detector identifier of the detector 130 that detected the lesser magnitude. Based on the detected lesser magnitude, the controller 120 can determine the distance each detector 130 is from the first detector 130. The controller 120 can save the identifiers and associated lesser magnitudes for each of the detectors 130. The controller 120 can limit the number of saved lesser magnitudes and associated identifiers by only saving a predetermined number of values (e.g., eight detector identifiers with the greatest associated lesser magnitudes). This can be beneficial as less information must be saved and compared by the controller.

At act 1206, based on the received magnitudes for each detector 130, the controller 120 can determine the adjacency of all detectors 130 in a grid pattern. This can be done by using at least three received inputs for each detector 130 to determine the relative positions using a trilateration method. This is beneficial as the controller 120 can determine the adjacency of all detectors 130. Detectors 130 and fluid distribution devices 110 can be associated on a one to one basis, which would allow the controller 120 to further determine the adjacency of the fluid distribution devices. It should be appreciated that this is a particular methodology for determining adjacency of detectors 130 and other possible methodologies exist and can be completed by the system 100.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein can be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining can be stationary (e.g., permanent or fixed) or moveable (e.g., removable or releasable). Such joining can be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling can be mechanical, electrical, or fluidic.

References to "or" can be construed as inclusive so that any terms described using "or" can indicate any of a single, more than one, and all of the described terms. References to at least one of a conjunctive list of terms can be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements can differ according to other exemplary embodiments, and that such variations are intended to be encompassed by the present disclosure.

What is claimed is:

1. A system of ceiling-only fire protection of a storage structure, comprising:

a plurality of fluid distribution devices to dispose in a grid pattern beneath a ceiling and above the storage structure having a nominal storage height less than a nominal ceiling height, wherein each of the plurality of fluid distribution devices includes a frame body with a seal assembly disposed therein and an actuator arranged with the frame body to displace the seal assembly to control a flow of water discharge from the frame body;

a plurality of detectors to monitor the storage structure for a fire; and a controller to couple with the plurality of detectors to detect and locate the fire, the controller coupled with the plurality of fluid distribution devices to identify and control operation of a select number of the plurality of fluid distribution devices that define a discharge array above and about the fire, the controller to:

receive an input signal from each of the plurality of detectors; and determine that a first threshold moment in fire growth has been met based on the input signal from one detector of the plurality of detectors, that a second threshold moment in fire growth has been met based on the input signal from two adjacent detectors of the plurality of detectors, or that a third threshold moment in fire growth has been met based on the input signal from three adjacent detectors of the plurality of detectors, a first threshold of the first threshold moment in growth is greater than a second threshold of the second threshold moment in growth;

transmit, based on the determination that the first threshold moment in fire growth has been met, a first control signal to operate a fluid distribution device of the plurality of fluid distribution devices associated with the one detector of the plurality of detectors;

transmit, based on the determination that the second threshold moment in fire growth has been met, a second control signal to operate two fluid distribution devices of the plurality of fluid distribution devices associated with the two adjacent detectors of the plurality of detectors.

2. The system of claim 1, comprising:

the controller to:

store a predetermined number of received input signals from each of the plurality of detectors, wherein an oldest received input signal value is discarded as a new input signal value is received; and calculate, based on the predetermined number of received input signals from each of the plurality of detectors, an average temperature for each of the plurality of detectors.

3. The system of claim 1, comprising the controller to:

generate the first control signal for operation of all fluid distribution devices immediately surrounding the fluid distribution device associated with the one detector of the plurality of detectors.

4. The system of claim 1, comprising the controller to:

generate the second control signal for operation of the fluid distribution devices surrounding the two fluid distribution devices associated with the two adjacent detectors.

5. The system of claim 1, comprising the controller to: generate a third control signal for operation of fluid distribution devices associated with two detectors of the three adjacent detectors and the fluid distribution devices surrounding the two detectors of the three adjacent detectors, wherein the two detectors are diagonally adjacent.

6. The system of claim 1, wherein the storage structure is an automated storage and retrieval system.

7. A system of ceiling-only fire protection of a storage structure, comprising:

a plurality of fluid distribution devices disposed in a grid pattern beneath a ceiling and above the storage structure having a nominal storage height less than a nominal ceiling height, wherein each of the plurality of fluid distribution devices includes a frame body with a seal assembly disposed therein and an actuator arranged with the frame body to displace the seal assembly to control a flow of water discharge from the frame body;

a fluid distribution system including a network of pipes interconnecting the plurality of fluid distribution devices with a water supply;

a plurality of detectors to monitor the storage structure for a fire; and a controller coupled with the plurality of detectors to detect and locate the fire, the controller being coupled with the plurality of fluid distribution devices to identify and control operation of a select number of the plurality of fluid distribution devices that define a discharge array above and about the fire, the controller:

receives an input signal from each of the plurality of detectors;

determines a rate of temperature rise and a temperature for each of the plurality of detectors;

determine a weighted value, for each of the plurality of detectors, of the rate of temperature rise and the temperature, based on a multiplier assigned to the rate of temperature rise and a multiplier assigned to temperature;

generates a ranking for each of the plurality of detectors based on the weighted value;

determines a threshold moment in fire growth from a first detector of the plurality of detectors; and generate an output signal for operation of a first fluid distribution device associated with the first detector of the plurality of detectors and fluid distribution devices surrounding the first fluid distribution device.

8. The system of claim 7, comprising:

the controller to:

store a predetermined number of received input signals from each of the plurality of detectors, wherein an oldest received input signal value is discarded as a new input signal value is received; and calculate, based on the predetermined number of received input signals from each of the plurality of detectors, an average temperature for each of the plurality of detectors.

9. The system of claim 7, comprising:

the controller to:

wait until a second detector of the plurality of detectors and a third detector of the plurality of detectors are determined to meet or exceed a second threshold moment in fire growth;

generate an output signal for operation of a second fluid distribution device of the plurality of fluid distribution devices that is associated with the second detector of the plurality of detectors, a third fluid distribution device of the plurality of fluid distribution devices that is associated with the third detector, fluid distribution devices of the plurality of fluid distribution devices that are surrounding the second fluid distribution device, and fluid distribution devices of the plurality of fluid distribution devices that are surrounding the third fluid distribution device.

10. The system of claim 9, wherein the second threshold moment in fire growth is equal to the threshold moment in fire growth.

11. The system of claim 7, comprising:

the controller to:

determine a second detector with a highest temperature located to the north, south, east, and west of the first detector of the plurality of detectors;

generate an output signal for the operation of a second fluid distribution device of the plurality of fluid distribution devices that is associated with the second detector and fluid distribution devices of the plurality of fluid distribution devices that are surrounding the second fluid distribution device.

12. The system of claim 7, comprising:

the controller to:

determine a second detector with a highest temperature located to the north, south, east, west, north-west, north-east, south-west, and south-east of the first detector of the plurality of detectors;

generate an output signal for the operation of a second fluid distribution device of the plurality of fluid distribution devices that is associated with the second detector and fluid distribution devices of the plurality of fluid distribution devices that are surrounding the second fluid distribution device.

13. The system of claim 7, wherein the storage structure is an automated storage and retrieval system.

14. A method of ceiling-only fire protection of a storage structure, comprising:

providing a plurality of fluid distribution devices disposed in a grid pattern beneath a ceiling and above the storage structure having a nominal storage height less than a nominal ceiling height, wherein each of the plurality of fluid distribution devices includes a frame body with a seal assembly disposed therein and an actuator arranged with the frame body to displace the seal assembly to control a flow of water discharge from the frame body;

connecting a fluid distribution system including a network of pipes with the plurality of fluid distribution devices with a water supply;

providing a plurality of detectors to monitor the storage structure for a fire;

coupling a controller with the plurality of detectors to detect and locate the fire;

coupling the controller with the plurality of fluid distribution devices to identify and control operation of a select number of the plurality of fluid distribution devices that define a discharge array above and about the fire;

receiving, by the controller, an input signal from each of the plurality of detectors; and evaluating, by the controller, a first threshold moment in fire growth based on the input signal from one detector of the plurality of detectors, a second threshold moment in fire growth based on the input signal from two adjacent detectors of the plurality of detectors, and a third threshold moment in fire growth based on the input signal from three adjacent detectors of the plurality of detectors, a first threshold of the first threshold moment in growth is greater than a second threshold of the second threshold moment in growth;

transmitting, based on determining that the first threshold moment in fire growth has been met, a first control signal to operate a fluid distribution device of the plurality of fluid distribution devices associated with the one detector of the plurality of detectors;

transmitting, based on determining that the second threshold moment in fire growth has been met, a second control signal to operate two fluid distribution devices of the plurality of fluid distribution devices associated with the two adjacent detectors of the plurality of detectors.

15. The method of claim 14, comprising:

storing, by the controller, a predetermined number of received input signals from each of the plurality of detectors, wherein an oldest received input signal value is discarded as a new input signal value is received; and calculating, by the controller based on the predetermined number of received input signals from each of the plurality of detectors, an average temperature for each of the plurality of detectors.

16. The method of claim 14, comprising:

generating, by the controller, the first control signal for operation all fluid distribution devices immediately surrounding the fluid distribution device associated with the one detector of the plurality of detectors.

17. The method of claim 14, comprising:

generating, by the controller, the second control signal for operation of the fluid distribution devices surrounding the fluid distribution devices associated with the two adjacent detectors.

18. The method of claim 14, comprising:

generating, by the controller, a third control signal for operation of fluid distribution devices associated with two detectors of the three adjacent detectors and the fluid distribution devices surrounding the two detectors of the three adjacent detectors, wherein the two detectors are diagonally adjacent.

* * * * *